4 Sheets—Sheet 1.
F. E. SICKELS.
Steam Engine.
No. 909.
Reissued Feb. 21, 1860.
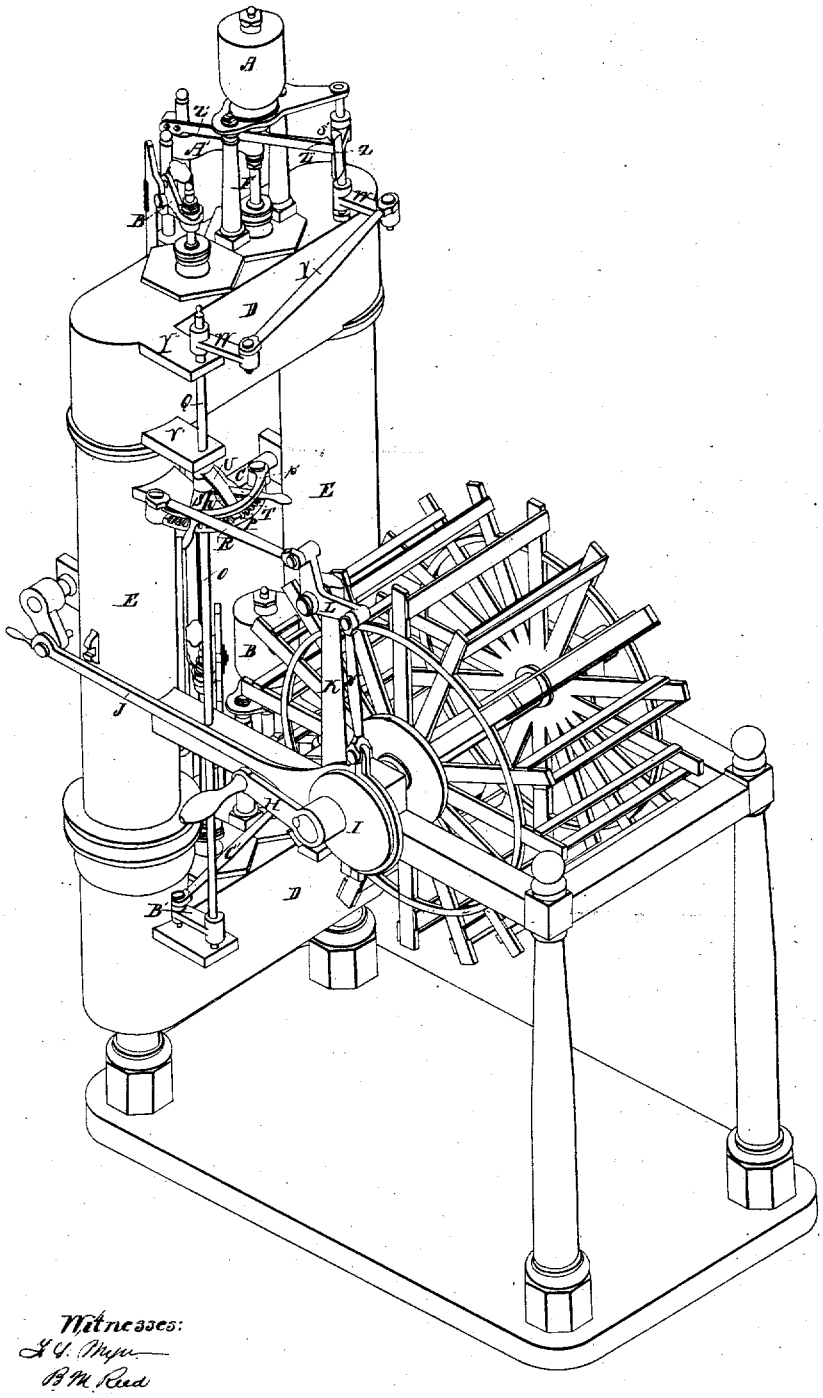
Witnesses:
J. G. Myers
B. M. Reed
Inventor:
F. E. Sickels
N. PETERS. Photo-Lithographer, Washington, D. C.

4 Sheets—Sheet 2.
F. E. SICKELS.
Steam Engine.
No. 909. Reissued Feb. 21, 1860.
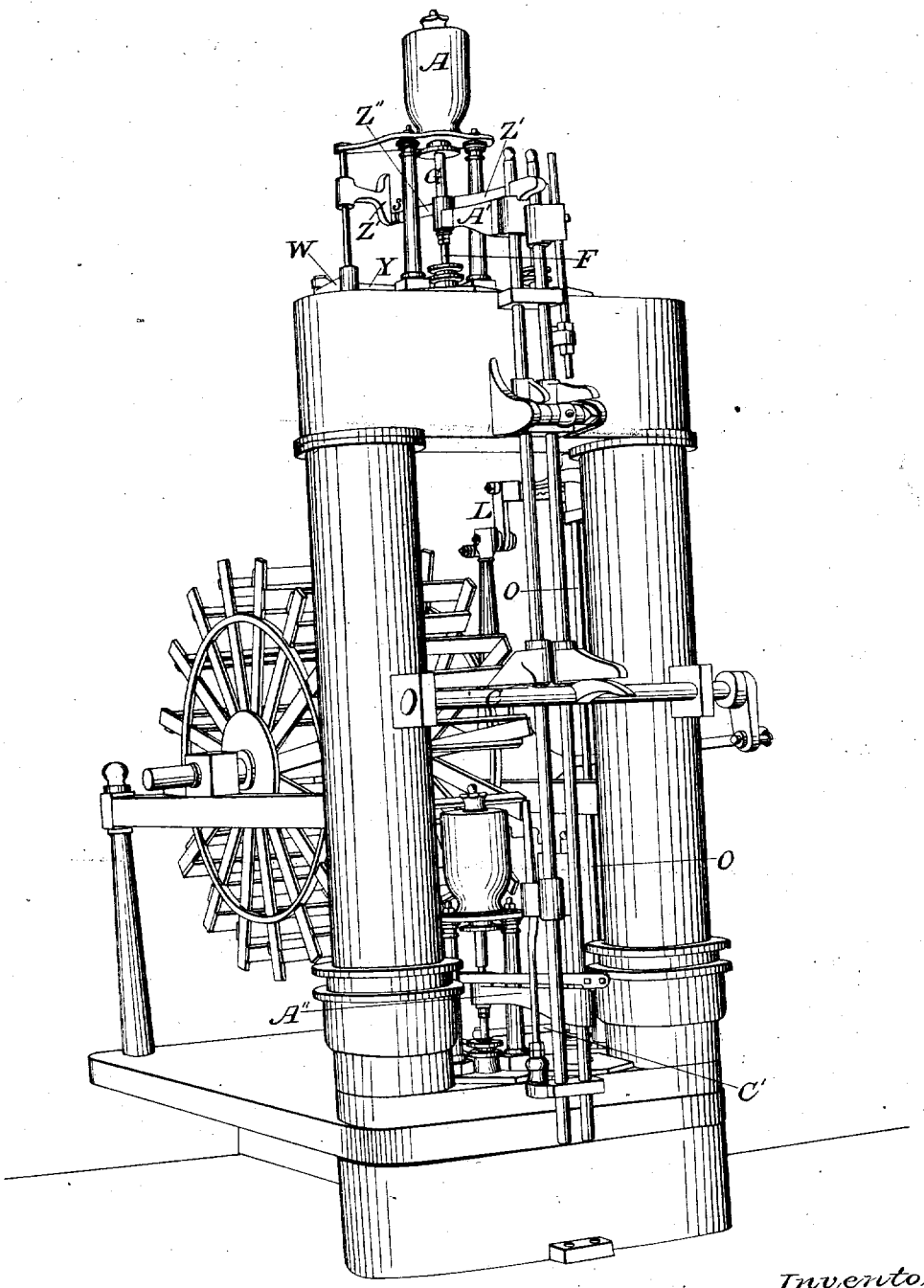
Witnesses:
H. S. Mynn
B. McKeed
Inventor:
F. E. Sickels
N. PETERS, Photo-Lithographer, Washington, D. C.

4 Sheets—Sheet 3.
F. E. SICKELS.
Steam Engine.
No. 909.
Reissued Feb. 21, 1860.
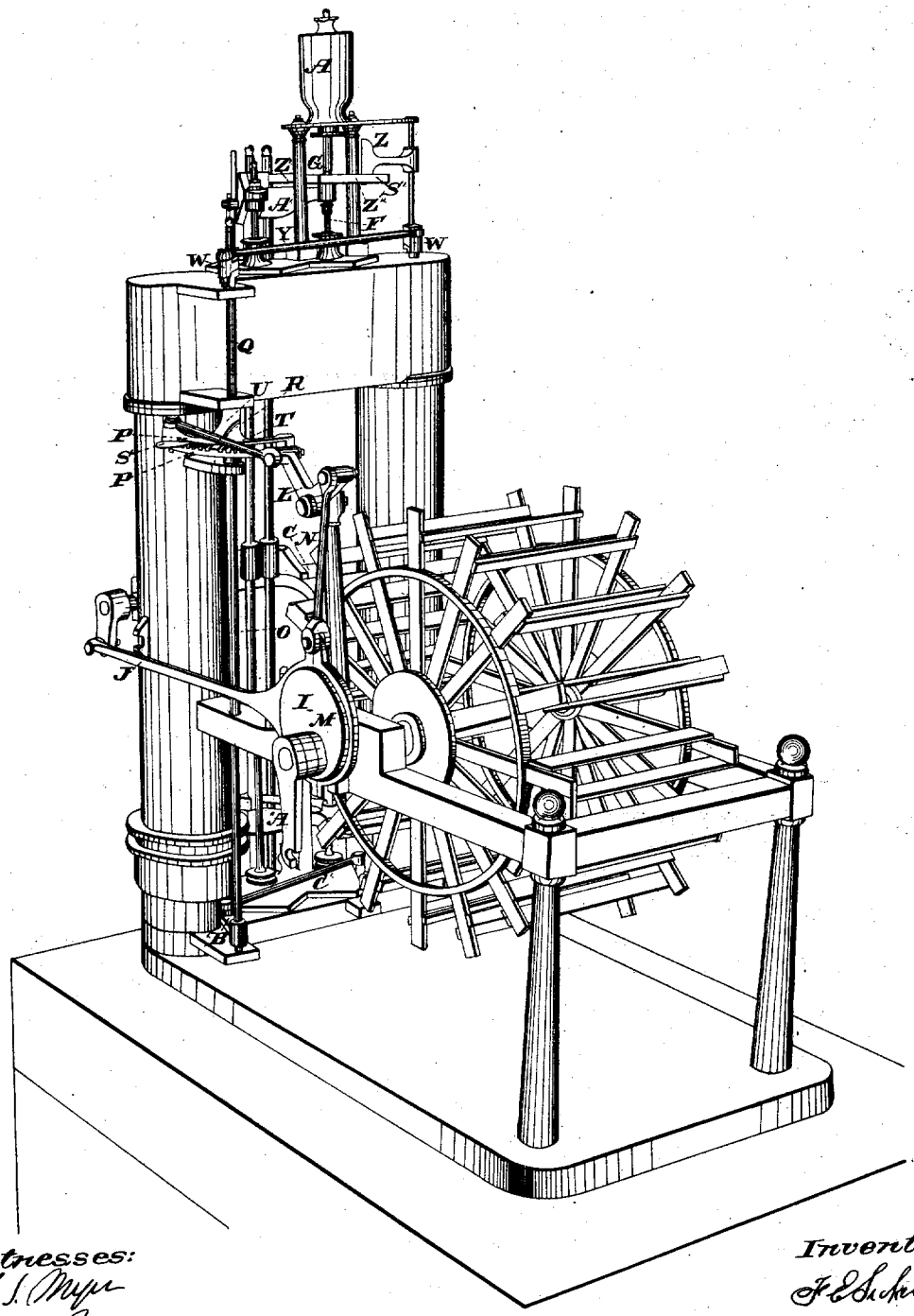
Witnesses:
G. S. Myer
B. W. Kerr
Inventor:
F. E. Sickels
N. PETERS, Photo-Lithographer, Washington, D. C.

4 Sheets—Sheet 4.
F. E. SICKELS.
Steam Engine.
No. 909.
Reissued Feb. 21, 1860.
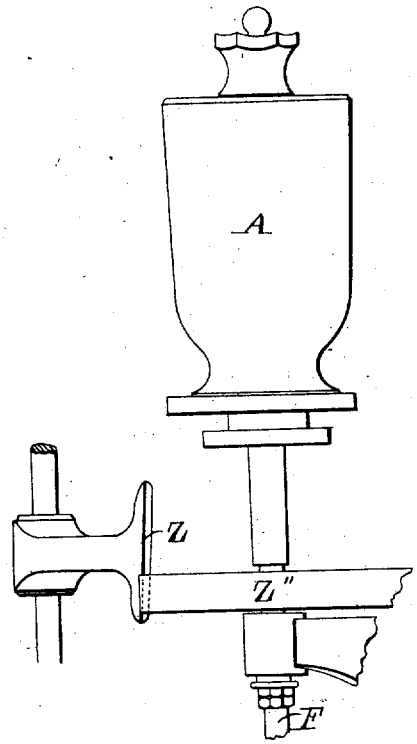
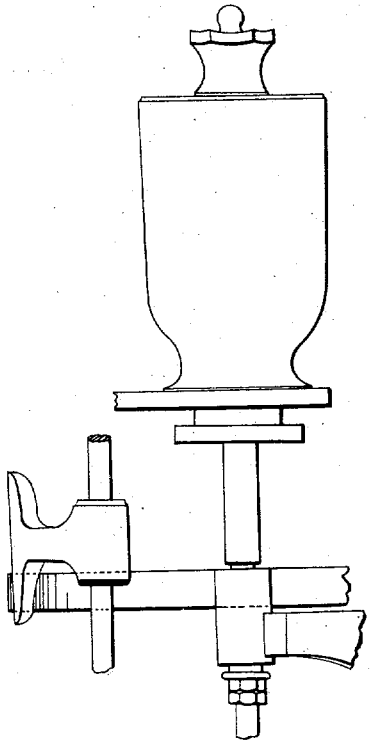
Witnesses:
L. S. Myers
B M Keen
Inventor:
F. E. Sickels
N. PETERS, Photo-Lithographer, Washington, D. C.

UNITED STATES PATENT OFFICE.

FREDERICK E. SICKELS, OF NEW YORK, N. Y.

IMPROVEMENT IN STEAM ENGINES.

Specification forming part of Letters Patent No. 4,202, dated September 19, 1845; extended 7 years; Reissue No. 909, dated February 21, 1860.

DIVISION NO. 3.

*To all whom it may concern:*

Be it known that I, FREDERICK ELSWORTH SICKELS, of the city, county, and State of New York, have invented a new and useful Improvement in Steam-Engines; and I do hereby declare that the following is a full, clear, and exact description of the character thereof, which distinguishes it from all other things before known, and of the manner of making and using the same, reference being had to the accompanying drawings, which make a part of this specification.

The nature of my invention consists in liberating a weight, spring, or other force to move a valve to cut off, by the aid of an independent motion, in combination with a regulating-reservoir, so as to facilitate a rapid closing of the valve at certain periods of the stroke. In cutting off when the lifter motion is in a state of rest, and using this motion alone to disconnect the weight, in combination with a regulating-reservoir to arrest the momentum, it is necessary to retard the descent of the weight and closing of the valve, thus incurring the loss of a slow-closing cut-off when it is required to act at certain periods of the stroke, as the weight must be liberated some time before, while there is yet motion on the lifter; but if an independent motion—that is, a motion not controlled by a lifter-motion, that approaches a state of rest as the piston approaches the middle of the cylinder—is used to aid in liberating a weight, spring, or other force, this loss may be avoided, as the weight or other force can then be liberated at the moment required, and the valve closed rapidly if a regulating-reservoir is used to resist the force and momentum of the rapid-moving parts, and if an adjustable mechanism is used the rapid closing can be maintained at different parts of the stroke.

In the accompanying drawings, Sheets 1, 2, and 3, three views are shown of this improvement, in connection with others patented to me the same day as this, and they will be described in part to facilitate the explanation of the improvement herein patented, notwithstanding it may be used without them.

The same letters refer to the same parts in each figure.

F is a valve rod or stem, having a piston or plunger attached to its upper end, operating within a reservoir, A, shaped smaller at the bottom, which may confine the fluid contained therein as the plunger descends, substantially in the same manner described in the patent granted to me May 20, 1842, so as to regulate the velocity of a falling weight connected to the stem, that is sufficient to overcome all friction in closing the valve. To this rod or stem the valve must be attached. Either single, double, or slide valves may be used. A spring, Z′, has a catch-piece, Z″, connected to it, that fits into a notch formed by the catch G, and extends beyond, which piece Z″ has a curved projection, S, at the extreme end, against which the outer face of this arm or wiper Z strikes as it vibrates on its vertical axis. The outer face of this arm or wiper is parallel with its shaft or axle, and is of greater length than the motion of the lifter, so that it can act upon the curved projection on the catch-piece Z″ as it is carried up and down by the lifter, so as to determine the time when the weight shall close the valve.

The vibratory motion of the arm or wiper Z is obtained in the following manner: On its axle there is an arm, W′, connected by a rod, Y, with a similar arm, W, on the upper end of a vertical shaft, Q, which has a spring-arm, T, at its lower end, (the outer end handle form,) with its under face provided with a fillet or catch to fall into the teeth on the upper face of the sector P, that vibrates on the axis of the shaft Q, and is held by means of the arms U U, that project from two collars that turn one on the lower end of the shaft Q and the other on the upper end of a corresponding shaft, O, below it. From one end of this sector a connecting-rod, R, extends to one arm of a bell-crank, L, the other arm of which is connected by a connecting-rod, N, with the strap M of the eccentric I, and at right angles to the eccentric-rod J, that operates the rock-shaft C of the lifters A′ A″, so that the sector P and the parts deriving motion from it are moving while the lifters are in a state of rest, and therefore the liberation of the weight to close the valve can be effected when the lifter-motion alone would be inefficient, and thus obtain a rapid closing of the valve at this part of the stroke, if a regulating reservoir is used to control the momentum. The shaft O, which is below, has a spring-arm, S, similar and corresponding to the one, T, before described, and at its lower end an arm, B′, and connecting-rod C′, corresponding with the arm W and rod Y above, and all other corresponding parts to work the cut-off valve for this end of the cylinder are substantially the same as the parts above described for the other end of the cylinder. The sector P has a plate, P′, above and parallel with it for the purpose of strength and to act as a guard for the spring-arms S T. The face of the sector P is provided with two sets of teeth, each extending from the middle or arms U U to the ends, and the length of each part of the sector is such that the motion of the spring-arms S T from one extremity to the other of the sector shall shift the position of the cam or wiper Z and the corresponding one below, so that when the spring-arms are at the outer end of the segment the cams or wipers shall vibrate without permitting the weight to move the valve to cut off, and by moving them toward the middle the extent of the cut-off shall be reduced from the maximum to the minimum—that is to say, to cut off from the greatest to the least portion of the stroke.

It will be evident from the foregoing that any motion derived from any part of the engine may be substituted for the motion of the arms or wipers, provided it has motion as distinguished from the lifter motion—as, for instance, instead of the horizontal vibratory motion of the arms or wipers, the time when the weight may be permitted to act to close the cut-off valve may be regulated by a vertical descending motion as the lifter rises, and in this case it will be by the co-operation of this independent motion with another motion that the liberation of the weight will be effected.

Other forms of adjustable mechanism than that here shown may be used for the independent motion; or all may be dispensed with in the use of this invention.

Other mechanism than the trip and catch can be used to transfer the weight from the mechanism that lifts it to a regulating-reservoir, that may be of any suitable form or kind to control the momentum; but the transfer mechanism should be placed as near the valve as practicable, so as to have as little friction as possible in the liberated parts to encounter in rapidly closing the valve, with a regulating-reservoir properly constructed to control the momentum of the rapidly-moving parts.

Sheet No. 4 shows the elevation of parts before described, (it being understood that the form and arrangement of them will depend in each case, as in this, upon the general arrangement of the valve-gear,) and to which attention is particularly required in order to understand this invention.

A is the regulating-reservoir.

Z″ is the catch-piece.

Z is the wiper, moved by an independent motion.

F is the valve rod or stem to which the weight and valve are attached.

What I claim as new, and desire to secure by Letters Patent, is—

Liberating the closing weight or apparatus to cut off by the aid of an independent motion, in combination with a regulating-reservoir to resist the force and momentum of the rapidly-moving parts in cutting off.

FREDERICK E. SICKELS.

Witnesses:
C. W. GEDDES,
F. S. MYER.